April 13, 1954  G. HEINISH  2,674,897
RESILIENT SHEAVE

Filed June 11, 1949  4 Sheets-Sheet 1

Inventor
GEORGE HEINISH

By  Ely & Frye

ATTORNEYS

April 13, 1954 G. HEINISH 2,674,897
RESILIENT SHEAVE

Filed June 11, 1949 4 Sheets-Sheet 3

Inventor
GEORGE HEINISH

By Ely & Frye

ATTORNEYS

INVENTOR.
GEORGE HEINISH

Patented Apr. 13, 1954

2,674,897

UNITED STATES PATENT OFFICE 2,674,897

RESILIENT SHEAVE

George Heinish, Akron, Ohio, assignor, by mesne assignments, to The S. D. M. Company, Akron, Ohio, a corporation of Delaware Application June 11, 1949, Serial No. 98,550

6 Claims. (Cl. 74—230.01)

This invention relates to resilient sheaves and more particularly sheaves which are used in well drilling equipment, but which also may be used under any conditions where it is desirable to relieve shock, vibration, etc., which are imposed by a steel cable or wire rope upon the sheave and the machine carrying the latter.

It has heretofore been proposed to use rubber as a cushioning medium in sheaves, but in all former constructions with which I am familiar, the rubber was merely placed between the cable carrying member and the hub under no compression except that due to the weight of the cable carrying member, and was displaced only by compression forces or shocks which it was expected to cushion upon radial movement of the cable carrying member with respect to the hub. As a result, the rubber in these former constructions did not always do a complete cushioning job and frequently required replacement due to excessive wear and tear. I have discovered that if the rubber is placed in the sheave so that it absorbs the forces and shocks while the rubber is mounted in shear and "preloaded" so that it is partially displaced at all times, the cushioning action is much more satisfactory and the life of the rubber is increased. Hence, it is an object of this invention to provide a sheave construction wherein the rubber is mounted in shear.

Another object is to provide a sheave construction in which a pair of annular rubber "sandwiches" are formed by bonding a rubber annulus between two metal plates, the "sandwiches" then being mounted under heavy pressure on opposite sides of the cable carrying portion of the sheave so that the rubber functions in shear in "preloaded" condition while absorbing the shocks and strains to which the sheave and the machine carrying it might otherwise be subjected.

A further object is to provide novel locking means for holding the rubber in the "sandwiches" in shear and "pre-loaded" after the various parts of the sheave have been assembled.

A further object is to provide a modified sheave construction wherein the rubber annuli are bonded directly between the cable carrying member and a pair of outer metal plates, thus providing a single, integral unit in the nature of a double-decker "sandwich," such unit then being mounted as a whole under heavy pressure on the hub so that the rubber will function in shear and in "preloaded" condition as it absorbs shocks and strains, locking means similar to those previously referred to being provided for holding the rubber in "preloaded" condition.

Other objects and advantages will become apparent from the following description taken in conjunction with the accompanying drawings.

Figure 2:
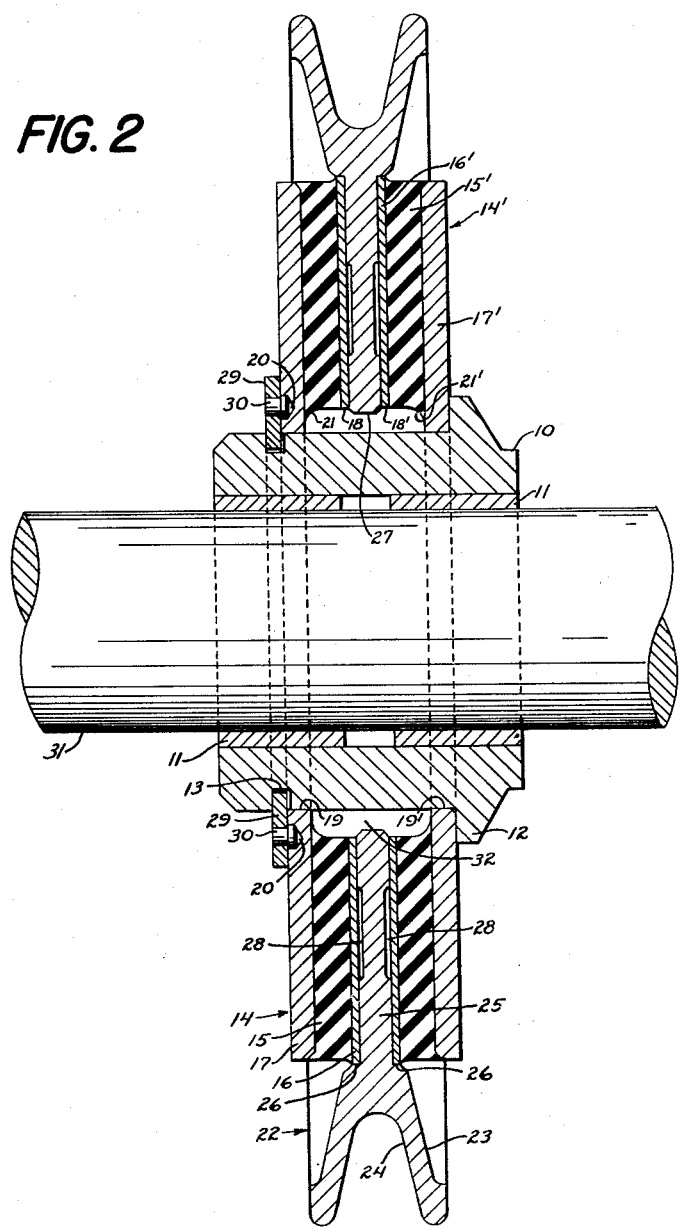
Fig. 2 is an enlarged vertical section taken substantially on line 2—2 of Fig. 1, with the parts completely assembled and the rubber "preloaded,"
Figure 3:
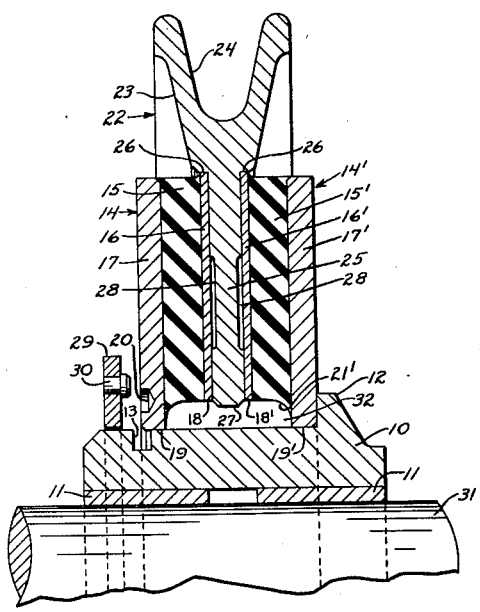
Figure 4:
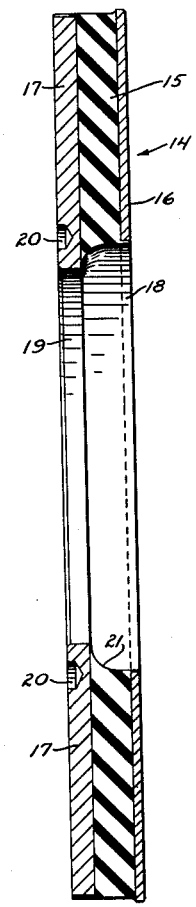
Figure 5:
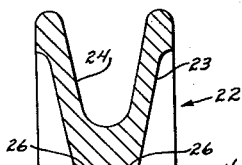
Figure 6:
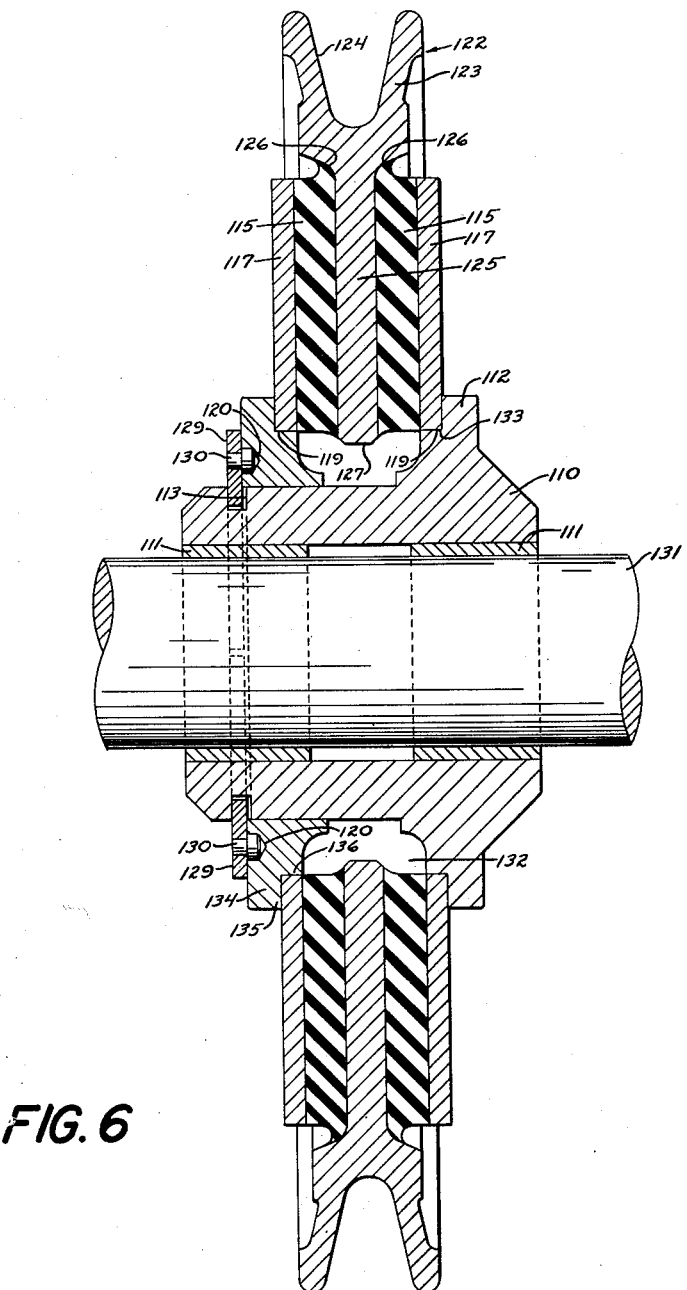

Fig. 3 is a fragmentary section showing the parts of the sheave before they are locked in operative position, and before any compression is applied to "preload" the rubber, Fig. 4 is a section through one of the rubber sandwiches, Fig. 5 is a view similar to Fig. 3 with the rubber under heavy pressure just prior to the parts being locked in operative position, and Fig. 6 is a view similar to Fig. 2 showing a modified shave construction with the rubber bonded directly to the cable carrying member and being "preloaded."

Figure 1:
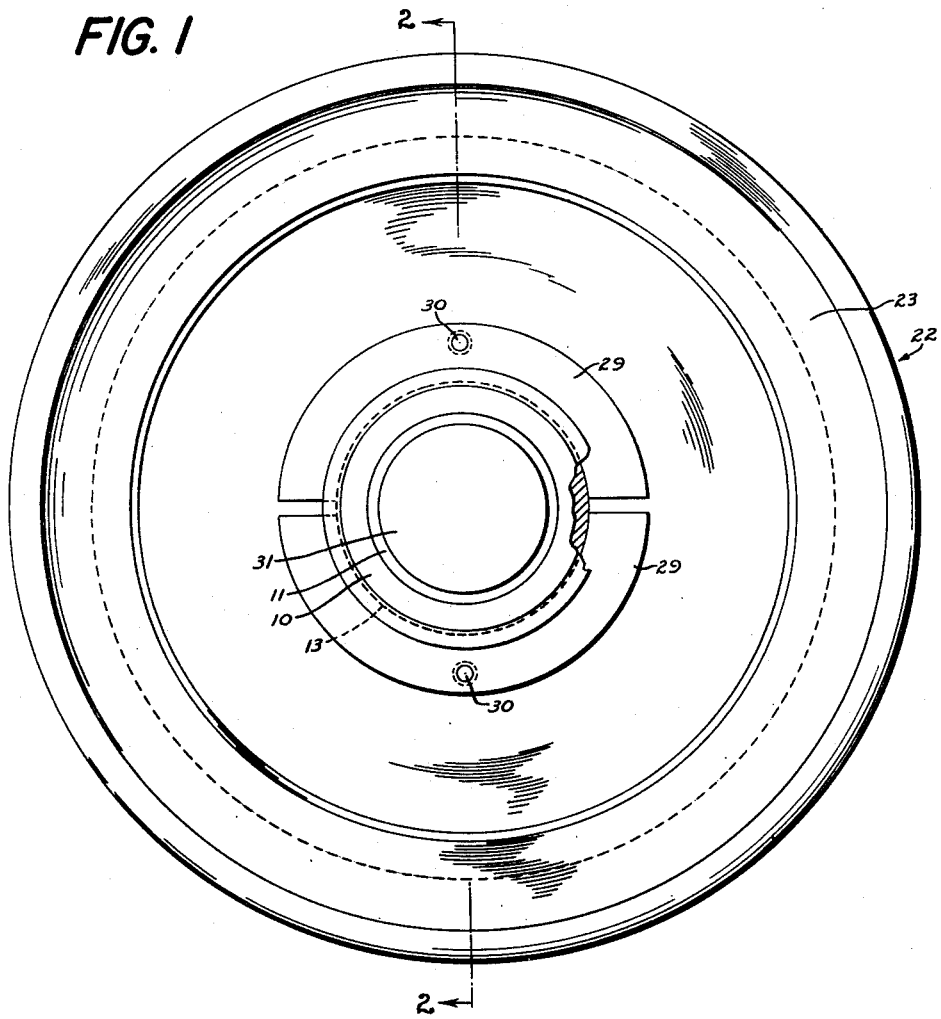
Fig. 1 is a side elevation of one form of my resilient sheave.

Referring to Figs. 1 to 5 of the drawings, Figs. 1 and 2 show the parts of one form of the sheave completely assembled, and this assembly includes an annular metallic hub 10 preferably formed of steel, having spaced bronze bushings 11 press fitted inside the hub. Adjacent one end, the outer periphery of the hub is provided with an annular integral flange 12, while adjacent its opposite end the hub is provided with an annular groove 13.

Fig. 4 shows one of the rubber "sandwiches" used with the form of the invention shown in Figs. 1 to 5, which is indicated as a whole by the numeral 14, and which comprises a rubber annulus 15 bonded or vulcanized between inner and outer steel plates 16 and 17. The rubber may be bonded to the metal by any of the well known methods now in use for vulcanizing rubber to steel. As shown, the inner plate 16 is about one-third as thick as the outer plate 17 and is of larger outside diameter than the latter plate, but plate 16 has a central opening 18 of larger diameter than the central opening 19 in plate 17. However, the thickness of these plates may be varied as found desirable. At diametrically opposite points adjacent its opening 19, the plate 17 is provided with lock pin receiving openings 20 that extend partially through the plate. It will be noted from Fig. 4 that after bonding, the outer periphery of the rubber annulus 15 is about flush with the outer periphery of plate 17, but is slightly inwardly of the outer periphery of plate 16. The inner periphery of the rubber member is curved as indicated at 21, whereby at one side it is about flush with the inner periphery of plate 16 and then decreases in thickness as it extends to about the inner periphery of plate 17. The purpose of mounting the rubber in this manner will be later explained.

The second rubber "sandwich," indicated as a whole by the numeral 14' is identical in all respects to the member 14, except that no lock pin receiving openings are required, and the parts of member 14' referred to with primed numbers are identical with their unprimed counterparts in member 14.

The cable carrying portion of the sheave consists of a steel wheel-like member, indicated as a whole by the numeral 22, having an outer generally tapered portion 23 provided with a tapered cable receiving groove 24, and having an integral body portion 25 reduced in thickness so as to provide annular shoulders 26 adjacent the juncture of the body and outer portions. A central opening 27 is provided in wheel 22 of greater diameter than the outer diameter of hub 10, and annular grooves 28 may be formed on the sides of the body portion 25 to reduce the weight of the wheel.

Referring now to Fig. 3, it will be observed how the parts already described are assembled. First, the rubber "sandwich" 14' is passed over the hub 10 until outer plate 17' engages the inner face of flange 12, the respective diameters of the hub 10 and plate 17' being such as to permit the plate to be snugly fitted over the hub. Next, the wheel 22 is passed over the hub until the side face of the body portion 25 engages inner plate 16' and the outer periphery of the latter plate snugly engages one of the shoulders 26. Then the second rubber "sandwich" 14 is snugly fitted over the hub until inner plate 16 engages the side face of body portion 25 and the outer periphery of plate 16 snugly engages the other shoulder 26. At this point in their assembly the parts will appear substantially as shown in Fig. 3 with plate 17 partly obstructing groove 13 before any compression is applied to "preload" the rubber.

Two semi-circular locking members 29 in the shape of half rings are now placed on the outer periphery of hub 10 adjacent plate 17, and each member 29 carries a locking pin 30 force fitted or otherwise securely held thereby. The thickness of members 29 is slightly less than the width of groove 13 in the hub and the pins 30 are of a size to be snugly received in openings 20 in plate 17.

A heavy pressure, for example, about 20 tons, is now applied to the outer face of plate 17 in the direction indicated by the arrows in Fig. 5 and the rubber members 15 and 15' will be compressed, thereby allowing plate 17 to move along hub 10 a distance sufficient to allow the two locking members 29 to be moved into the groove 13. The plate 17 must be moved from approximately the position shown in Fig. 3 to approximately the position shown in Fig. 5 in order to allow the locking members 29 with their protruding locking pins 30 to be moved into groove 13. After the locking members 29 are in the groove 13 and each locking pin 30 is in alignment with one of the openings 20, the pressure against plate 17 is gradually reduced until this plate returns to the position shown in Fig. 2, with the locking pins 30 extending into the openings 20.

When the parts were in their Fig. 3 position before any pressure was applied, the rubber members 15 and 15' were not subjected to any stresses or strains. While the parts were in their Fig. 5 position the rubber members were under substantial compression forces which displaces the rubber substantially as indicated in Fig. 5, and when the parts returned to their Fig. 2 position, which is their normal operative position, these compression forces were not completely removed. Hence, these rubber members may be said to be "preloaded" since they are under compression in their operative position. This "preloading" of the rubber provides the force which maintains the locking members 29 in proper position so that the complete assembly is held together. This "preloading" also serves the purpose of removing tensional strains in the rubber and therefore increases the useful life of the rubber.

Now, it will be observed from Fig. 2 that when the sheave assembly is mounted in any suitable manner on a horizontal shaft, such as the shaft 31, the cable carrying member 22 is cushioned in a rubber mounting in which the rubber is held in shear in "preloaded" condition, and in which substantially all of the stresses to which the rubber is subjected are shear stresses. Due to the fact that the central openings 18 and 18' in plates 16 and 16', and the opening 27 in wheel 22 are of greater diameter than the outer diameter of hub 10, a relative large opening 32 is formed around the hub between plates 17 and 17', which opening provides ample space for cushioned movement of the cable carrying member toward and away from the hub in response to shocks, vibration, etc., on a metal cable passing around the cable carrying member.

In Fig. 6 I have shown a modified form of sheave construction wherein the rubber annuli are bonded directly to the body portion of the cable carrying member. As shown, a slightly modified form of steel hub 110 is provided having spaced bronze bushings 111 press fitted inside this hub. Hub 110 is also provided adjacent one end with an annular integral flange 112 of greater diameter than flange 12, and is further provided with an annular groove 113 adjacent its opposite end, similar to groove 13.

A pair of rubber annuli 115, generally similar to rubber members 15 and 15' are bonded between plates 117, which are substantially similar to plates 17 and 17', and the side faces of the body portion 125 of the cable carrying member 122. The latter member is of slightly different shape than member 22, but has an integral generally tapered outer portion 123 having a tapered cable receiving groove 124 therein, similar to the corresponding parts of member 22. However, the relatively sharp shoulders 26 at the juncture of the body and outer portions in the first form of the invention are eliminated from the modified form, and the body and outer portions 125 and 123 are joined in a substantial curved area 126 which provides a greater surface on the cable carrying member for the rubber to be bonded to, as indicated in Fig. 6. Also, in the modified form of the invention, the central openings 119 in plates 117 are of greater diameter than central opening 127 in member 122.

In the modified form of the invention, the rubber annuli also may be bonded to the cable carrying member and the plates 117 by any of the well known methods now in use for vulcanizing rubber to steel. After the bonding process has been completed, the unit comprising cable carrying member 122, rubber annuli 115, and plates 117 is mounted as a whole on hub 110.

To facilitate the mounting of this unit, hub 110 has a shoulder portion 133 adjacent flange 112 which is of smaller diameter than flange 112 and which with the face of the latter flange snugly receives one of the plates 117, as clearly shown in Fig. 6. To properly position the other plate 117, an adapter ring 134 is snugly fitted over the hub 110 until its flange 135 and shoulder 136 snugly engage the latter plate 117 in the manner shown in Fig. 6. The diameter of flange 135 is equal to the diameter of flange 112, and the diameter of shoulder 136 is equal to that of shoulder 133 so that the unit containing the members is properly balanced on the hub. On its outer side face, ring 134 is provided with oppositely disposed lock pin receiving openings 120 similar to the openings 20.

After the adapter ring 134 is in proper position against the adjacent plate 117, heavy pressure is applied against the outer side face of this ring to compress the rubber annuli 115 in the same manner that rubber members 15 and 15' were compressed. The pressure against ring 134 is continued until the latter has moved far enough to permit the locking members 129, identical with the similar members 29, and having lock pins 130 identical with pins 30, to be moved into groove 113 with pins 130 extending into openings 120. After the locking members 129 are in proper position, the pressure against ring 134 is reduced so that the elasticity of the rubber members will force ring 134 tightly against the locking members to hold this assembly together, but without completely relaxing the rubber members. Since the rubber members 115 are thus also under compression in their operative position, these rubber members are also "preloaded."

Hence, when the modified sheave construction is suitably mounted on a horizontal shaft, such as the shaft 131, the cable carrying member 122 is also cushioned in a rubber mounting in which the rubber is held in shear in "preloaded" condition. In fact, the modified construction functions in substantially the same manner as the first described construction, and is substantially identical therewith, except that the plates 16 and 16' are omitted from the modified construction. The opening 132 formed around the hub 110, although of different shape than opening 32, provides ample space for cushioned movement of the cable carrying member 122 toward and away from the hub 110.

My improved sheave constructions have been found to be very satisfactory in use on drilling rigs, and the life of the parts, including the rubber members has been greatly increased. It is to be understood that the term rubber as used herein includes any suitable natural or synthetic rubber or rubber-like material.

While I have shown and described the preferred forms of the invention, it will be understood that the invention is not limited to these forms, and that changes and modifications may be made therein without departing from the spirit of the invention or from the scope of the subjoined claims.

What is claimed is:

1. A sheave construction comprising a hub having a peripheral flange adjacent one end thereof, locking means adjacent the other end of said hub, a unit mounted on said hub between said flange and said locking means, said unit comprising a cable carrying member having oppositely disposed side faces, a pair of rubber annuli each of which has one side face bonded directly to one of said side faces of said member, and a pair of plates each of which is bonded to one of the other side faces of said rubber annuli, the arrangement being such that said rubber annuli are preloaded and mounted between said cable carrying member and said plates so as to absorb shear stresses imposed on the rubber by movement of said cable carrying member.

2. A sheave construction comprising a hub having a peripheral flange adjacent one end thereof, an adapter ring on said hub adjacent the other end thereof and having a peripheral flange, a unit mounted between said flanges, said unit comprising a cable carrying member, a pair of plates spaced on opposite sides of said member, and rubber members bonded directly between said cable carrying member and each of said plates, and means for locking said unit between said flanges with the rubber members preloaded and in shear relationship with said cable carrying member and said plates.

3. A sheave construction of the character defined in claim 2 wherein said locking means is retained in operative position by a force obtained from said preloaded rubber members.

4. A sheave construction comprising a hub having a peripheral flange adjacent one end thereof, locking means adjacent the other end of said hub, a cable carrying member surrounding said hub and movable toward and away from said hub, rubber cushioning members mounted between said cable carrying member and said hub with the rubber mounted in shear relationship with said cable carrying member, said rubber being preloaded by compression forces acting in the direction of said flange, and being held in preloaded condition by said locking means, said hub being provided with an annular groove adjacent the opposite end from said flange, and said locking means including a pair of oppositely disposed semi-annular members receivable in said groove.

5. A sheave construction comprising a hub having a peripheral flange adjacent one end thereof, locking means adjacent the other end of said hub, a cable carrying member surrounding said hub and movable toward and away from said hub, rubber sandwiches mounted between said cable carrying member and said hub to cushion said movement of said member, said rubber in said sandwiches being mounted in shear relationship with said member, said rubber being preloaded by compression forces acting in the direction of said flange, and being held in preloaded condition by said locking means, said hub being provided with an annular groove adjacent the opposite end from said flange, and said locking means including a pair of oppositely disposed semi-annular members receivable in said groove.

6. A sheave construction comprising a hub having a peripheral flange adjacent one end thereof, an adapter ring on said hub adjacent the other end thereof and having a peripheral flange, a unit mounted between said flanges, said unit comprising a cable carrying member, a pair of plates spaced on opposite sides of said member, and rubber members bonded directly between said cable carrying member and each of said plates, and means for locking said unit between said flanges with the rubber members preloaded and in shear relationship with said cable carrying member and said plates, said hub being provided with an annular groove adjacent said adapter ring, and said locking means including a pair of oppositely disposed semi-annular members receivable in said groove.

References Cited in the file of this patent

UNITED STATES PATENTS

| Number | Name | Date |
| --- | --- | --- |
| 1,894,432 | Watson | Jan. 17, 1933 |
| 2,033,862 | Piron | Mar. 10, 1936 |
| 2,172,641 | Piron | Sept. 12, 1939 |
| 2,175,118 | Hirshfeld | Oct. 3, 1939 |